Nov. 26, 1968   J. K. SCHAEFER   3,413,593
ISOLATED ELECTRICAL TERMINAL CONNECTION
Filed Nov. 3, 1967   3 Sheets-Sheet 1
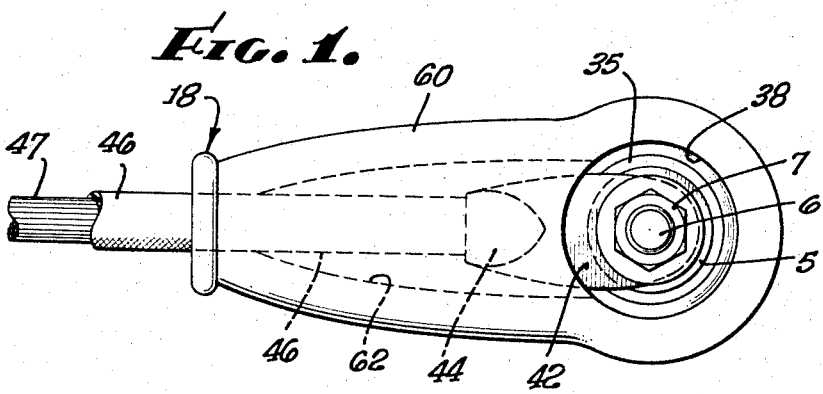
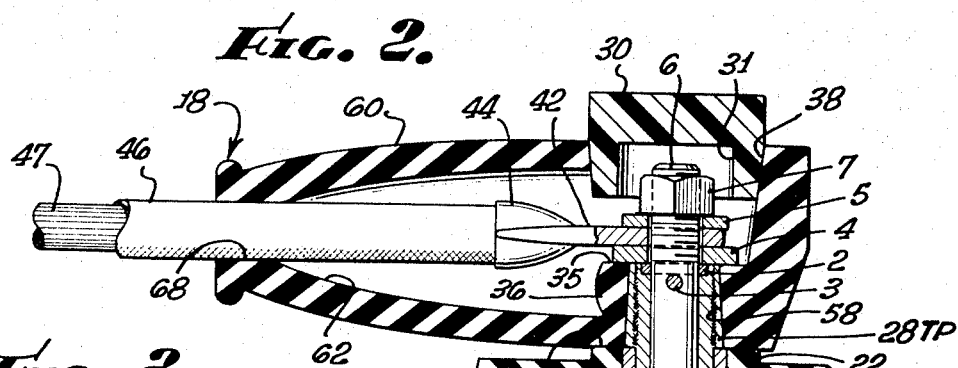
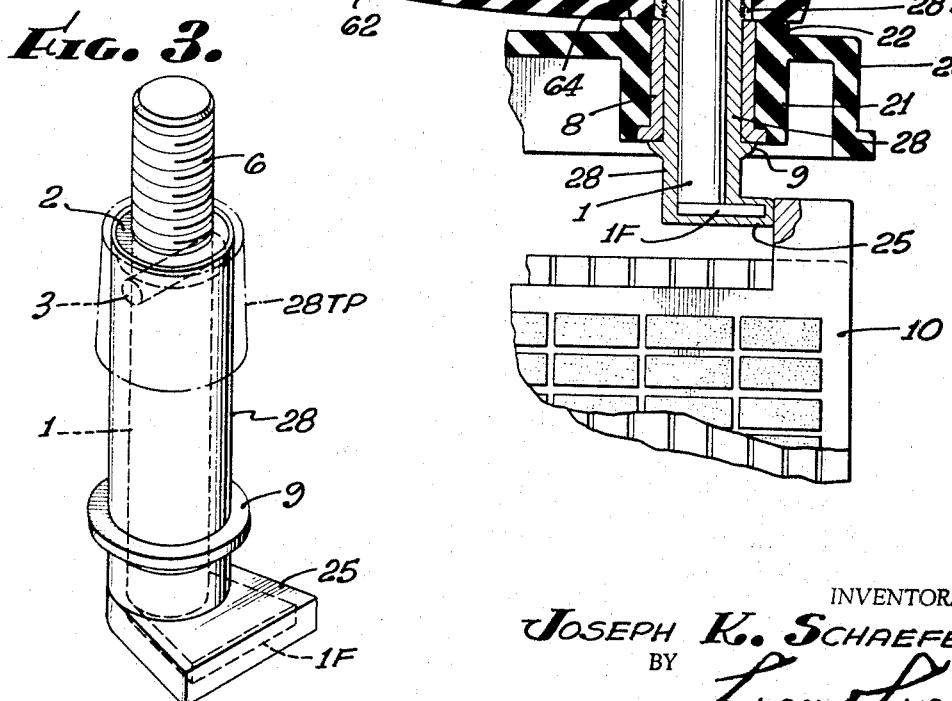
INVENTOR.
JOSEPH K. SCHAEFER
BY
Lyon & Lyon
ATTORNEYS Nov. 26, 1968    J. K. SCHAEFER    3,413,593
ISOLATED ELECTRICAL TERMINAL CONNECTION
Filed Nov. 3, 1967    3 Sheets-Sheet 3
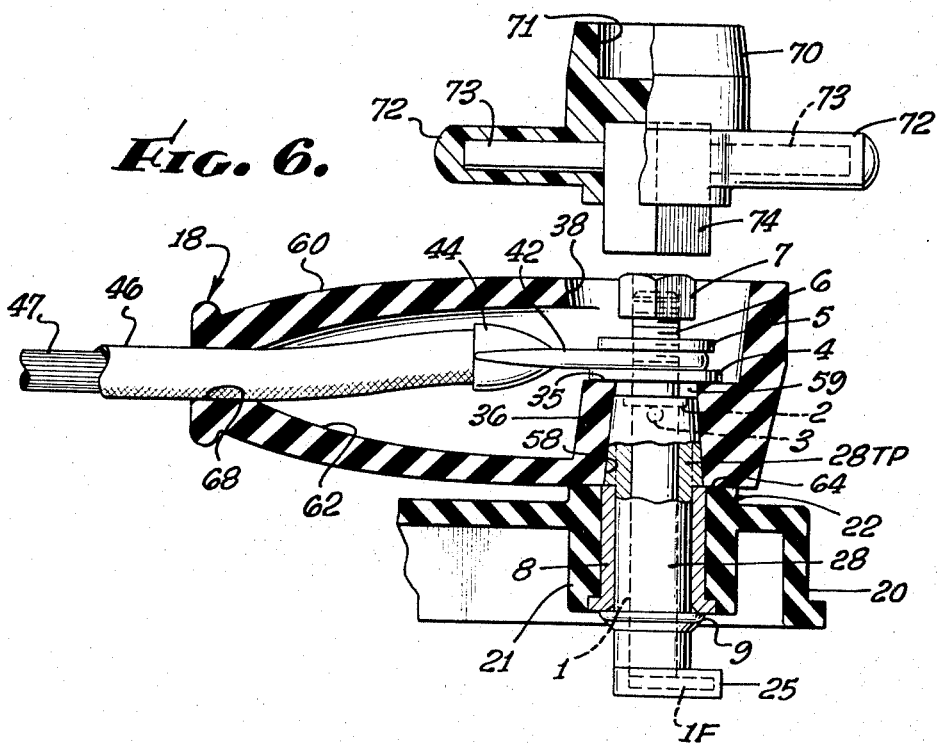
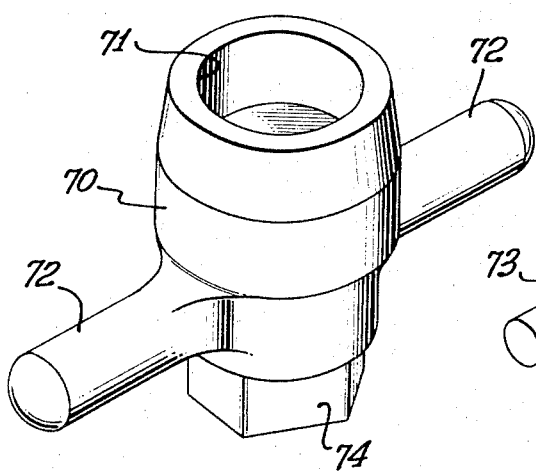
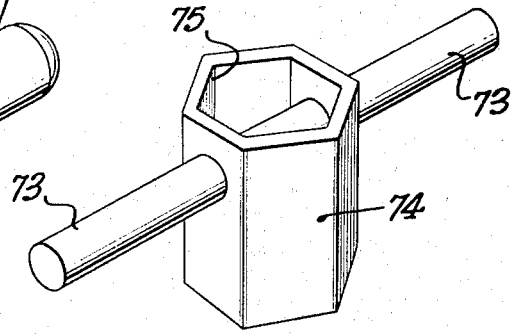
INVENTOR.
JOSEPH K. SCHAEFER
BY
Lyon & Lyon
ATTORNEYS United States Patent Office 3,413,593
Patented Nov. 26, 1968

3,413,593
ISOLATED ELECTRICAL TERMINAL
CONNECTION
Joseph K. Schaefer, 2107 N. Beachwood Drive,
Hollywood, Calif. 90028
Filed Nov. 3, 1967, Ser. No. 685,229
9 Claims. (Cl. 339—116)

ABSTRACT OF THE DISCLOSURE

An electrical terminal connection particularly adaptable for use with storage batteries, in which the battery terminal post has a threaded stud imbedded therein yet the dimensions of a standard SAE terminal post are maintained allowing interchangeability of a standard battery terminal connector or a terminal lug; the invention further providing a housing surrounding the connector and the terminal post which prevents the entry of moisture or contaminants which otherwise cause corrosion.

Description

The present invention relates to an improved electrical connector for terminals such as those on batteries. Primarily, the present invention is related to a means for providing an electrical connection for batteries or the like which is isolated to prevent the harmful effects of moisture, air, or gas. This invention constitutes an improvement over the partially isolated connector shown in my prior U.S. Patent No. 2,760,178 issued Aug. 21, 1956.

One of the problems involved in the use of battery terminal connectors, or any electrical terminal connections, is that exposure of the metallic parts thereof to the elements frequently results in corrosion which ultimately results in failure of the electrical conducting properties of the connection. This problem is more acute in the case of the lead-acid storage battery since the vapors from the electrolyte considerably increase the rate of corrosion at the battery terminals. An additional problem is presented when a lead-acid storage battery is required to operate under water. Certain tactical vehicles used by the military are required to operate submerged or semi-submerged for certain periods of time during which electrical power is required. Furthermore, such tactical vehicles must be capable of operation in salt water as well as fresh water. Since salt water is a very fine conductor of electricity, a battery which is submerged therein will be quickly short circuited and discharged unless the terminals thereof are isolated from the salt water. The methods heretofore attempted to prevent discharge of a battery under such conditions have consisted mainly of sealing the battery in a moisture-proof container through which the battery cables must extend. Such a container frequently is not sufficiently watertight or else is difficult to open and close in order to change the battery.

It is an object, therefore, of this invention to provide a simple and efficient terminal connection which isolates said connection from the air or moisture.

It is also an object of this invention to provide an electrical connection which can be submerged in water without harmful effects.

It is a further object and advantage of the present invention to provide a battery terminal connection which maintains the standard battery terminal size and shape yet provides an improved means of connecting a cable thereto wherein the connection will be isolated from air, moisture and gas. More specifically, it is an object of the present invention to provide a battery terminal connection that is simple and efficient, consisting of relatively few parts, and which is capable of operation while submerged in salt water for several days without noticeable increase in the normal rate of discharge of the battery.

It is another object of this invention to provide an improved battery terminal post which maintains the standard SAE terminal post dimensions yet also provides a threaded stud thereby allowing interchangeability of the standard battery terminal connector with the connector of the present invention.

It is a more specific object of this invention to provide an improved threaded battery terminal connection with a sealed housing surrounding said connector and provided with a removable sealing plug for access to said threaded connector. It is an additional object of the invention to provide a removable sealing plug in a sealed housing surrounding the terminal connector wherein said sealing plug includes a wrench for use with the threaded connector.

Further objects and advantages of the invention will become apparent upon reading the following description in conjunction with the drawings in which:

FIGURE 1 is a partial top view of a connector made in accordance with this invention showing the flexible water proof housing with the access plug removed.

FIGURE 2 is a partial sectional side elevation of a battery and battery terminal connection made in accordance with the present invention.

FIGURE 3 is a perspective view of an improved form of battery terminal post.

FIGURE 6 is a partial sectional side elevation similar to FIGURE 4, but wherein the parts are shown partially disconnected in a non-sealing relationship.

FIGURE 7 is a perspective view of the combination sealing plug and wrench.

FIGURE 8 is a perspective view of the wrench used herein prior to the application thereto of the material required to form the sealing plug.

Figure 4:
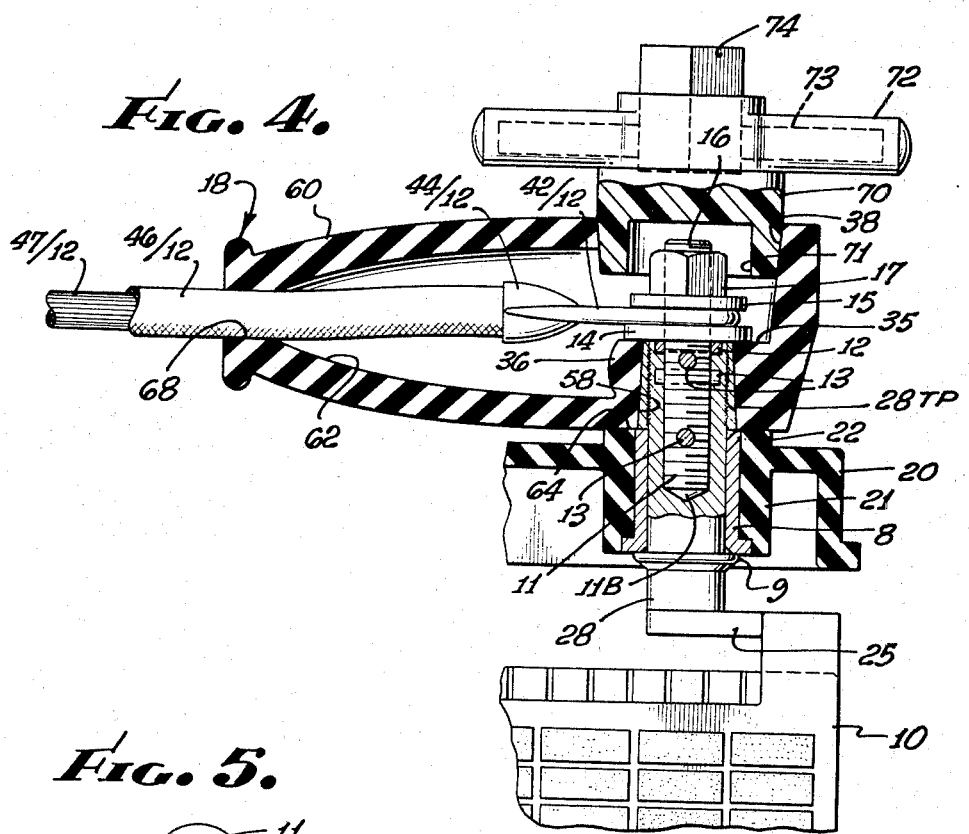
FIGURE 4 is a partial sectional side elevation of another form of the present invention showing in section, a portion of a battery and the terminal connection made in accordance with this invention.

Referring now to FIGURES 2 and 3, a standard battery terminal post is shown at 28 having a transversely extending foot piece 25 at the bottom thereof. Foot piece 25 is provided for attaching the terminal post to the grid plates 10 of the battery. The Society of Automotive Engineers has standardized the sizes of battery terminal posts so that the upper portion of terminal post 28, which is designated 28TP, to which the familiar split cable terminal clamp is applied, varies in diameter depending on whether it is the positive or negative terminal. With this exception, the terminal post 28 is otherwise uniform. The customary battery terminal post 28 is made of die cast lead and is first formed without the top portion 28TP.

The cell cover of a battery is designated 20, shown in partial section, and is provided with a terminal post boss 21 through which the terminal post is to be projected. Terminal post boss 21 has an upper portion 22 which projects above the cell cover 20 and is of annular configuration. A lead terminal bushing 8 is projected through the cell cover 20 and seated against the terminal post boss 21. A circular collar 9 formed integrally on the lead terminal post 28 is positioned to abut bushing 8, thereby fixing the height that the terminal post will project above the cell cover 20 as specified by the SAE. In the manufacturing process of the standard battery, after the cell cover is placed over the terminal post, the posts are finished by placing the proper finished mold over the post, and heating the projecting portion of the terminal post and adding molten lead thereto. The post molds are of a specified diameter, taper and height and contain an annular recess that fits over the annular portion 22 of the terminal post boss 21.

In order to provide an improved terminal post as contemplated by the present invention in the form shown in FIGURES 2 and 3, it is only required that during the molding process of the terminal post 28, a partially threaded stud 1 be inserted in the mold. This insert stud 1 has a foot portion 1F formed integrally therewith forming a core in the interior of the load foot piece 25. At the other end of stud 1 there is provided a crosspin 3, and intermediate said crosspin 3 and said threaded portion 6 there is provided a circular washer 2. The angular foot piece 1F is provided in order to prevent rotation of stud 1 inside the terminal post 28 when torque is applied at the threaded end 6. The purpose of the crosspin 3 and washer 2 is to provide a positive stop against which a nut 7 may be tightened on threaded portion 6 to further eliminate the possibility of pulling the stud 1 out of the soft lead terminal post 28. In addition, crosspin 3 will also serve to aid in preventing rotation of the stud 1. Crosspin 3 and washer 2 are positioned along the length of stud 1 at the point which will be flush with the top of the lead terminal post 28. By providing a washer 2 of steel or similar metallic substance, deformation of the top of the terminal post will be prevented even through the nut 7 is tightened considerably.

It will thus be seen that the standard battery terminal post is maintained by the above procedure so that the standard split terminal cable connector can still be used at the option of the owner. The provision of such an improved terminal does not disrupt the ordinary manufacturing process of the battery terminal in the factory.

Figure 5:
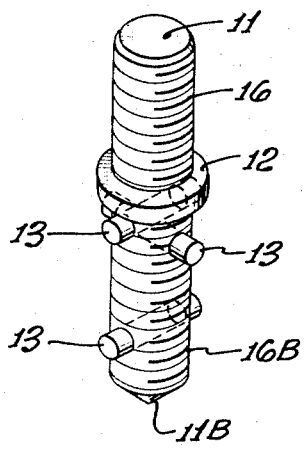
FIGURE 5 is a perspective view of another form of stud to be added to the standard battery terminals post in accordance with this invention.

Referring now to FIGURES 4 and 5, another form of stud 11 is shown of slightly different configuration. This type of stud is provided for installation outside of the factory in batteries already manufactured without the stud insert 1 as shown in FIGURE 3. It would be difficult to install a stud having an integrally formed angular foot piece similar to that shown at 1F. In place of the foot piece 1F, stud 11 is provided with a number of crosspins 13 to resist rotation of the stud 11 in the terminal post 28. As before provided in stud 1, stud 11 is provided with a shoulder washer 12 which rests upon one of the crosspins 13 thereby affording support to the washer 12. This washer may be permanently attached to one of the crosspins 13 by spot welding or a similar process to form a unitary part if desired. The position of washer 12 is adjusted so that it will be flush with the top of the terminal post 28 to afford a solid bearing support for fastening the battery cable connector.

The method of inserting a stud such as 11 in a previously cast terminal post is as follows. A standard SAE terminal post mold (not shown) will be provided. This mold has an annular recess which fits over the annular portion of the terminal post boss 22 and has the required size, taper and height for the standard battery terminal. This mold will be placed over the existing terminal post to maintain its shape. By attaching a heating element to the upper end of stud 11, the stud is heated and pushed slowly into the terminal post 28 which will displace a quantity of lead from the terminal post. The lead will flow over the top of the terminal with no harmful effects. When the stud 11 is inserted so that the top of shoulder washer 12 is flush with the top of the terminal, the heating element may be removed and the stud allowed to cool. The conical end portion 11B on the stud 11 will facilitate insertion into the terminal post and in addition will eliminate the formation of a void below the stud 11 which would be the case if a flat ended stud were used. When the article has cooled, the excess lead and the terminal post mold may be removed. The result will be a standard size and shape terminal post having a stud projecting therefrom. Stud 11 is provided with an upper threaded portion 16 and in addition may be threaded throughout its length as shown in 16B.

In FIGURES 2, 4 and 6, a flexible isolating housing is generally designated 18. Housing 18 consists of a flexible elongated sheath 60 having three openings therein. The opening designated 68 is provided for the side entry of battery cable 47, and has a diameter sufficient to mate in a tightly sealing relationship with the battery cable insulation 46. In FIGURE 2, it will be noticed that cable 47 is of heavier gauge of the approximate size used in 6-volt battery installations. In FIGURE 4, the battery cable indicated 47/12 is of the lighter gauge used for 12-volt batteries.

The second opening in housing 18 is the access bore 38 having slightly tapered wall surfaces. Bore 38 is provided with a sealing plug 30 also having tapered wall surfaces which will form a tight seal against wall 38. Sealing plug 30 has a recess cavity 31 to allow clearance of the upper threaded portion 6 of stud 1. Sealing plug 30 is made of a non-conductive material to assure isolation of the electrical connection in case the plug were pushed into contact with the top portion 6. Sealing plug 30 thus provides a means of quick access to the electrical connection while maintaining the moisture-proof condition of the interior of the housing. Since the walls 60 and 62 of the housing 18 are made of a flexible resilient material, frequent insertion and removal of plug 30 will have relatively no affect on the sealing properties of the plug.

The third opening in housing 18 is the tapered bore 58. The taper in bore 58 corresponds to the taper specified by the SAE for the battery terminal post 28TP, but is of slightly lesser diameter in order to form a sealing relationship therewith. As may best be shown in FIGURE 6, when the housing 18 is installed over a battery terminal post prior to tightening the nut 7 on the threaded stud 6, the height of bore 58 is slightly in excess of the height of terminal post 28TP. Thus, when housing 18 is in contact with the top portion 64 of the annular post boss 22, the upper horizontal surface 35 of bore 58 projects above the upper surface of washer 2 as is shown at 59.

A moisture tight seal is created at the tapered bore 58 in the housing 18 when the connection is completed. The cable 47 is inserted in the housing 18 forming a seal at 68. Cable 47 is provided with a cable fitting 44 having either a center formed or a side formed flat cable lug 42 having a hole through which the threaded stud is projected. Before cable lug 42 is inserted over the stud, a compression washer 4 is installed in contact with the horizontal surface 35. Then cable lug 42 is installed followed by a flat washer 5 and nut 7. When nut 7 is tightened, it forces compression washer 4 downward until it abuts the terminal post washer 2. In moving this distance, the vertical wall 36 of housing 18 is compressed which creates a tight horizontal seal between bore 58 and terminal post 28TP. In FIGURE 2, it will be noted that compression has caused a bulge in the vertical surface 36, augmenting the sealing relationship on the terminal post. In addition to the horizontal seal on the terminal post itself, tightening of the electrical connection forces the housing 18 downward on the surface 64 creating a vertical seal at that point.

In FIGURE 4, the modified form of stud insert 11 is shown in conjunction with the use of the 12-volt size battery cable 47/12. The outer insulation of the battery cable is indicated 46/12, and the cable fitting and cable lug are each indicated 44/12 and 42/12 respectively. It will be noted that here again the exterior wall of the tapered bore 58 is bulged outwardly at 36 when the housing 18 is placed under partial compression under the washer 14, flat washer 15 and nut 17.

FIGURES 4, 6 and 7 illustrate a modified form of sealing plug 30, herein designated 70. Plug 70, in the position shown in FIGURE 4, has tapering side walls which mate with the tapering side walls 38 of housing 18 to form a tight seal. In addition, plug 70 is provided with a recess cavity 71 similar to cavity 31 of plug 30. As an additional improvement over sealing plug 30, sealing plug 70 is provided with a socket wrench 74. As shown in FIGURE 8 this consists of a hexagonal socket 75 with a cross handle 73 inserted therein. The sealing plug is then formed by molding a plastic or resilient material over the hexagon socket assembly 74 as shown in FIGURE 7 and in addition forms an insulated cross handle 72. The combination moisture-proof connector is thus provided with its own wrench eliminating the necessity of extra tools for this new type of connector. At the same time, the moisture and gas sealing properties of the terminal connection are maintained when the plug 70 is in place.

While particular embodiments of the present invention have been shown and described in conjunction with battery terminals, it will become obvious to those skilled in the art that the unique features of this invention could be applied to any electrical terminal connection, and that changes and modifications could be made therein without departing from this invention in its broader aspects, and it is the aim of the appended claims to cover all such changes and modifications which fall within the true scope and spirit of this invention.

I claim:

1. An improved terminal connection comprising a terminal having a threaded fastening means thereon, said fastening means having means for preventing rotation thereof relative to said terminal; a flexible non-conducting terminal housing having three openings therein; a first opening adapted to permit the projection of an electric cable therethrough, said first opening capable of forming a seal about said cable; a second opening adapted to permit access to the interior of said housing and an access plug for sealing closed said second opening; a third opening in said housing adapted to receive said terminal therein, said third opening having a configuration conforming substantially to that of said terminal and adapted to form a seal therebetween; the aforesaid cable having a lug thereon, said lug receiving said threaded fastening means therein to be fastened securely to said terminal, said threaded fastening means operable to compress a portion of said housing adjacent said third opening to substantially augment the seal at said terminal.

2. An improved terminal connection comprising a terminal post having a threaded stud axially mounted therein, said stud having means for preventing rotation thereof relative to said terminal; a flexible non-conducting terminal housing having three openings therein; a first opening adapted to permit the projection of an electric cable therethrough, said first opening capable of forming a seal about said cable; a second opening adapted to permit access to the interior of said housing and an access plug for sealing closed said second opening; a third opening in said housing adapted to receive said terminal post therein, said third opening having a configuration conforming substantially to that of said terminal post and capable of forming a seal therebetween; the aforesaid cable having a lug thereon, said lug receiving said stud therein to be fastened securely thereto, said threaded stud operable to compress a portion of said housing adjacent said third opening to substantially augment the seal about said terminal post.

3. An article of the type described in claim 2 wherein said access plug includes a socket wrench molded into the body of said plug.

4. An improved terminal connection comprising a terminal post having a threaded fastening means axially mounted therein, said fastening means having means for preventing rotation thereof relative to said terminal; a flexible non-conducting terminal housing having three openings therein; a first opening adapted to permit the projection of an electric cable therethrough, said first opening capable of forming a seal about said cable; a second opening adapted to permit access to the interior of said housing and an access plug for sealing closed said second opening; a third opening in said housing adapted to receive said terminal post therein, said third opening comprising a bore having a height greater than said terminal post and having a configuration conforming substantially to that of said terminal post; the aforesaid cable having a lug thereon for attaching said cable to said terminal post, said threaded fastening means operable to compress that portion of said housing bore which projects above said terminal post to create a seal about said terminal post.

5. An improved terminal connection comprising a terminal post having a threaded stud axially mounted therein, said stud having means for preventing rotation thereof relative to said terminal; a flexible non-conducting terminal housing having three openings therein; a first opening adapted to permit the projection of an electric cable therethrough, said first opening capable of forming a seal about said cable; a second opening adapted to permit access to the interior of said housing and an excess plug for sealing closed said second opening; a third opening in said housing adapted to receive said terminal post, said third opening comprising a bore having a height greater than that of said terminal post and having a configuration conforming substantially to that of said terminal post and adapted to form a seal therebetween; the aforesaid cable having a lug thereon, said lug attached to said stud, said threaded stud having a nut operable to compress that portion of said housing bore which projects above said terminal post to substantially augment the seal about said terminal post.

6. An article of the type described in claim 5 wherein said access plug is molded of a non-conductive material, a socket wrench having a cross handle being molded into the body of said plug.

7. As a subcombination, an improved battery terminal post having a threaded stud projecting therefrom, said stud axially mounted in said terminal post, said stud having one or more laterally projecting elements positioned intermediate the ends thereof, said lateral elements projecting into the body of said terminal post to prevent rotation of said stud, the lower end of said stud being conical to facilitate insertion into said terminal post.

8. As a subcombination, an improved battery terminal post having a threaded stud projecting therefrom, and a nut adapted to be threaded thereon, said stud axially mounted in said terminal post, said stud having one or more lateraly projecting elements positioned intermediate the end thereof, said lateral elements projecting into the body of said terminal post to prevent rotation of said stud, the lower end of said stud being conical to facilitate insertion into said terminal post, a crosspin and washer mounted upon said stud positioned to be flush with the top of said terminal post and adapted to coact with said nut when said nut is threaded thereon.

9. As a subcombination, a threaded stud adapted for the creation of an improved battery terminal, a nut adapted to be threaded on said stud, said stud having a conical lower end, a plurality of laterally projecting crosspins situated intermediate the ends of said stud, and a washer mounted on said stud secured to the topmost laterally projecting crosspin, said washer adapted to coact with said nut when said nut is threaded upon said stud.

References Cited

UNITED STATES PATENTS

| 1,176,942 | 3/1916 | Bliss | 339—116 X |
| 1,284,424 | 11/1918 | Morrison | 339—232 X |
| 1,602,039 | 10/1926 | Moyer | 339—95 |
| 1,722,203 | 7/1929 | Day | 339—116 X |
| 2,903,672 | 9/1959 | Ade | 339—232 |

RICHARD E. MOORE, *Primary Examiner.*